… … …

United States Patent [19]

Matner et al.

[11] 4,001,162
[45] Jan. 4, 1977

[54] STABLE HEAT-SENSITIVE LATEX MIXTURES

[75] Inventors: Martin Matner, Odenthal; Hermann Perrey, Krefeld; Ernst Schwinum, Leichlingen, all of Germany

[73] Assignee: Bayer Aktiengesellschaft, Leverkusen, Germany

[22] Filed: Apr. 7, 1975

[21] Appl. No.: 565,402

[30] Foreign Application Priority Data

Apr. 11, 1974 Germany .......................... 2417705

[52] U.S. Cl. ............... 260/29.6 SQ; 260/29.6 RW; 260/29.6 NR; 260/29.6 MQ; 260/29.6 N; 260/29.7 SQ
[51] Int. Cl.² .......................................... C08L 33/00
[58] Field of Search .......... 260/29.6 RW, 29.6 NR, 260/29.6 MQ, 29.6 N, 29.6 SQ, 45.7 S, 45.9 NC, 45.9 AA, 29.7 SQ

[56] References Cited

UNITED STATES PATENTS 2,731,433  1/1956  Johnson ..................... 260/29.7 SQ
3,702,315  11/1972  Knechtges et al. .......... 260/29.7 SQ Primary Examiner—M. J. Welsh
Attorney, Agent, or Firm—Connolly and Hutz

[57] ABSTRACT

Heat-sensitized polymer latex mixtures, wherein they contain from 0.05 to 10% by weight, based on polymer, of a heat-sensitizer and, as stabilizer, from 0.1 to 10% by weight, based on polymer, of a sulphonamide corresponding to the general formula

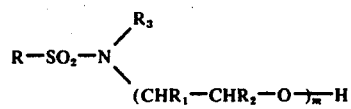

in which
R represents alkyl, chloroalkyl or cycloalkyl with 8 to 30 carbon atoms or alkaryl with 10 to 30 carbon atoms,
$R_1$ and $R_2$ independently of one another represent hydrogen, chloromethyl, methyl, ethyl, phenyl;
$m$ is an integer from 0 to 50 and
$R_3$ represents hydrogen, alkyl, alkaryl, aryl or $-(CHR_1-CHR_2-O)_m$ H with the above meanings for $R_1$, $R_2$ and $m$.

3 Claims, No Drawings

STABLE HEAT-SENSITIVE LATEX MIXTURES

Heat-sensitized latex mixtures are known. They are obtained from heat-sensitizable polymer latices. Latices of this kind can be obtained by emulsion polymerization. Their heat-sensitization and means suitable for this purpose are described, for example, in German Pat. Spec. Nos. 1,268,828, 1,494,037 and in U.S. Pat. Spec. No. 3,484,394. German Pat. Spec. No. 1,243,394 describes one process for the production of heat-sensitizable synthetic rubber latices. Heat-sensitized latex mixtures may be used for impregnating nonwoven materials and for producing hollow bodies (for example gloves) by the dip process.

Unfortunately, conventional heat-sensitized latex mixtures are not sufficiently stable during processing. In many cases, the mechanical stability of heat-sensitized latices is inadequate, with the result that undesirable separation occurs during processing on reversing rolls or between squeezing rollers. Measures for improving mechanical stability, for example the addition of non-ionic emulsifiers, generally have an adverse effect upon heat sensitizability, in other words larger quantities of heat sensitizers are required to adjust a given coagulation temperature.

The invention is based on the recognition that heat sensitized latex mixtures have better mechanical stability when they contain certain sulphonamides. Accordingly, the present invention relates to heat-sensitized polymer latex mixtures which are distinguished by the fact that they contain from 0.05 to 10% by weight of a heat sensitizer, based on the polymer, of a sulphonamide corresponding to the general formula:

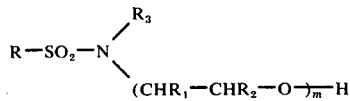

in which
R represents alkyl, chloroalkyl or cycloalkyl having 8 to 30 carbon atoms or alkaryl having 10 to 30 carbon atoms,
$R_1$ and $R_2$ independently of each other represent hydrogen, chloromethyl, methyl, ethyl or phenyl,
m is 0 or an integer from 1 to 50, and
$R_3$ represents hydrogen, alkyl, alkaryl, aryl or —(CHR$_1$—CHR$_2$—O)$_{\overline{m}}$H with $R_1$, $R_2$ and m having the above meanings.

Preferably,
R = n-alkyl or chloroalkyl having 10 to 20 carbon atoms or $C_8$ - $C_{18}$n-alkylphenyl,
$R_1$ and $R_2$ = H or methyl
m = 0 - 20,
$R_3$ = H or —(CHR$_1$—CHR$_2$—O)$_{\overline{m}}$H ($R_1$, $R_2$ and m as defined above).

The sulphonamides which are suitable for use in accordance with the invention can readily be obtained from the corresponding alkyl, chloroalkyl, cycloalkyl or alkaryl sulphochlorides by methods known from the literature (K. Lindner, Tenside-Textilhilfsmittel-Waschrohstoffe, vol. 1, page 722; Houben-Weyl IX, pages 343 – 657).

Alkyl, chloroalkyl and cycloalkyl sulphochlorides may be obtained for example by sulphochlorinating the corresponding alkanes. The methods used for sulphochlorination and the composition of the products are so well known (cf. F. Asinger in Chemie und Technologie der Paraffinkohlenwasserstoffe, 1956, Akademie-Verlag, pages 395 – 474) that there is no need for any further explanation to be given here.

Suitable alkylaryl sulphonic acid chlorides can be obtained in known manner for example from the alkylaryl sulphonic acids obtained (in some cases even on an industrial scale) by the alkylation of aromatic compounds, followed by sulphonation (cf. F. Asinger, Die Petrochemische Industrie, Vol. II, page 1249, Akademie-Verlag Berline 1971).

The sulphochlorides can be obtained by reaction with ammonia, aliphatic, araliphatic or aromatic primary amines such as, for example, methyl amine, ethyl amine, propyl amines, butyl amines, hexyl amines, allyl amine, benzyl amine or aniline, converted into the sulphonamides which are subsequently alkoxylated, for example with ethylene oxide, propylene oxide, 1,2- and 2,3-epoxy butane, 2,3-epoxy pentane, epichlorhydrin and styrene oxide, but preferably with the first two. These processes are also well known.

On the other hand, the sulphochlorides can also with alkanolamines and dialkanolamines, for example ethanolamine and diethanolamine, isopropanolamine and diisopropanolamine, N-methyl ethanolamine, N-cyclohexyl ethanolamine, N-benzyl ethanolamine and N-phenyl ethanolamine, to form the sulphonic acid amides according to the invention. These alkanolamides may optionally be varied by reaction with the alkylene oxides described above to form further examples of the compounds according to the invention.

In some cases, the effect of the sulphonamides according to the invention can be improved by additions of alkyl, chloroalkyl, cycloalkyl and alkaryl sulphonates. To this end, alkali or even alkanolamine salts of the sulphonic acids may be used as sulphonates in up to equal quantities by weight, based on the sulphonamides.

Heat-sensitized latex mixtures containing the sulphonamides defined above are distinguished by a high mechanical stability. No undesirable separations of coagulate occur, even when the heat sensitizer is added. Another advantage of the sulphonamides is their favourable biodegradability.

In the case of any conventional heat-sensitizable latices, stability may be improved by adding the sulphonamide stabilizers on completion of polymerization. Examples of the production of heat-sensitizable latices of this kind can be found in German Pat. No. 1,243,394 and in DT-OS No. 2,232,526 and DT-OS No. 2,005,974. However, stable latex mixtures are also obtained in cases where the sulphonamides are added at the beginning or during the course of latex polymerization. Heat-sensitizable latices of this kind have never been reported before.

To produce the heat-sensitizable stable latices themselves, conventional olefinically unsaturated monomers may be polymerized in aqueous emulsion. Suitable monomers include any radically polymerizable, olefinically unsaturated compounds, for example ethylene, butadiene, isoprene, acrylonitrile, styrene, divinyl benzene, α-methyl styrene, methacrylonitrile, acrylic acid, methacrylic acid, 2-chloro-1,3-butadiene, esters of acrylic acid and methacrylic acid with $C_1$ – $C_8$ alcohols or polyols, acrylamide, methacrylamide, N-methylol(meth)acrylamide, (meth)acrylamido-N-methylol methyl ether, itaconic acid, maleic acid, fumaric acid, diesters and semi esters of unsaturated dicarboxylic acids, vinyl chloride, vinylacetate, vinylidene chloride, which may be used either individually or in combination with one another.

Polymerization is carried out in the presence of emulsifiers for which purpose conventional non-ionic or anionic emulsifiers may be used either individually or in combination with one another. The total quantity of emulsifier amounts to between about 0.1 and 10% by weight, based on the monomers. Where the sulphonamides are actually added during polymerization, they are advantageously used in combination with standard commercial-grade emulsifiers, for example in combination with alkali sulphonates or sulphates of $C_{12} - C_{18}$ hydrocarbons or of alkylated aromatic hydrocarbons, or with non-ionic surfactants, or with salts of fatty acids or ricinic acids, or with salts of alkyl esters of sulphosuccinic acid.

The sulphonamide stabilizer is added in a quantity of from 0.1 to 10% by weight, based on the monomer, where it is actually added during latex polymerization, or in a quantity of from 0.1 to 10% by weight, based on the polymer, where it is added to the latex on completion of polymerization.

The emulsion polymerization reaction may be initiated with radical formers, preferably with organic peroxide compounds, which are used in quantities of from 0.01 to 2% by weight, based on the monomer. Depending upon the monomer combination, samll quantities of regulators, for example mercaptans, halogenated hydrocarbons, may also be used to lower the molecular weight of the polymer. Emulsion polymerization may be carried out in two ways: the total quantity of monomers and the greater part of the aqueous phase containing the emulsifiers may be initially introduced, polymerization initiated by addition of the initiator and the rest of the aqueous phase added continuously or in batches during the course of polymerization. It is also possible to "run in" the monomers. In this case, only part of the monomers and the aqueous phase containing the emulsifier are initially introduced and, after polymerization has been started, the rest of the monomers and the aqueous phase are introduced uniformly or in portions according to the conversion. The proportion of the monomer run in may be pre-emulsified in the aqueous phase. Both techniques are known.

Additives may be introduced into the heat-sensitizable latices before or during processing. Thus, acid-eliminating agents added in addition to the sensitiser promote coagulatability by reducing the coagulation temperature. Other additives include for example, pigments, dyes, fillers, thickeners, electrolytes, antiagers, water soluble resins or vulcanization chemicals.

After production, the heat-sensitizable latices are heat-sensitized by the addition of heat sensitizers in quantities of from 0.05 to 10% by weight, based on the polymer. Latices containing the sulphonamide stabilizers according to the invention are particularly stable, so that no coagulate formation occurs when heat sensitizers are added to these latices. Suitable heat sensitizers are inter alia organo-polysiloxanes, for example according to German Auslegeschrift No. 1,268,828, German Offenlegungsschrift No. 1,494,037 and U.S. Pat. Spec. No. 3,484,394. Other suitable heat sensitizers include polyvinyl methyl ethers, polyglycol ethers, polyether thioethers, poly-N-vinyl caprolactam and/or polycarboxylic acids.

The heat-sensitized latex mixtures according to the invention may be used for example for bonding nonwoven materials made of synthetic or natural fibres. Examples include nonwoven materials of cotton, rayon, wool, polyamides, polyesters, polyacrylonitrile, glass fibres, mineral wool, asbestos wool or metal filaments.

The following sulphonamide stabilizers corresponding to the formula

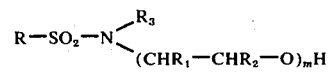

are used in the following Examples:

Table 1

| | R | $R_3$ | $R_1$ | $R_2$ | m |
|---|---|---|---|---|---|
| Stabiliser A | $C_{12}$-$C_{18}$-alkyl | H | H | H | 1 |
| Stabiliser B | $C_{12}$-$C_{18}$-alkyl | H | H | $CH_3$ | 1 |
| Stabiliser C | $C_{12}$-$C_{18}$-alkyl | H | — | — | 0 |
| Stabiliser D | $C_{12}$-$C_{18}$-alkyl | $CH_2$—$CH_2$—OH | H | H | 1 |
| Stabiliser E | $C_{12}$-$C_{18}$-alkyl | $CH_2$—CH—OH<br>$\|$<br>$CH_3$ | H | $CH_3$ | 1 |
| Stabiliser F | $C_{12}$-$C_{18}$-alkyl | H | H | H | 5.5 |
| Stabiliser G | $C_{12}$-$C_{18}$-alkyl | H | H | H | 7.5 |
| Stabiliser H | $C_{10}$-$C_{18}$-alkyl | $CH_3$ | H | H | 1 |
| Stabiliser J | $C_{12}$-$C_{18}$-alkyl | H | H | H | 12.0 |
| Stabiliser K | $C_{12}$-$C_{18}$-alkyl | H | H | H | 16.0 |
| Stabiliser L | $C_{12}$-$C_{18}$-alkyl | H | H | H | 22.7 |
| Stabiliser M | $C_{10}$-$C_{13}$-alkyl | H | H | H | 1 |
| Stabiliser N | $C_{12}$-$C_{18}$-alkyl | H | H | H | 3 |
| Stabiliser O | $C_{12}$-$C_{18}$-alkyl | H | H | H | 5 |
| Stabiliser P | $C_{12}$-$C_{18}$-alkyl | H | H | H | 8 |
| Stabiliser R | $C_{12}$-$C_{18}$-alkyl | H | H | $CH_3$ | 2 |
| Stabiliser S | $C_{12}$-$C_{18}$-alkyl | H | H | $CH_3$ | 3 |
| Stabiliser T | $C_{10}$-$C_{18}$-alkyl | $CH_2$—$\phi$(benzyl) | H | H | 11 |
| Stabiliser U | $C_{12}H_{25}$-$\phi$<br>(dodecyl benzene) | H | H | H | 1 |

EXAMPLE 1

An aqueous solution of 900 g of demineralized water, 1 g of the Na salt of a $C_{12}$–$C_{18}$-alkyl sulphonate and 1.5 g of stabiliser R is initially introduced into a 6 liter capacity sulphonation flask, followed by the addition of 10% of a monomer mixture of 750 g of n-butyl acrylate, 170 g of acrylonitrile, 50 g of methacrylamido-N-methylol methyl ether, 10 g of acrylic acid and 20 g of methacrylic acid. The flask is then flushed with nitrogen and heated to an internal temperature of 60° C. After this temperature has been reached, the contents of the flask are activated, while stirring, with 10 g of tert.-butyl-hydroperoxide and an aqueous solution of 2 g of Na formaldehyde sulphoxylate in 50 g of demineralized water. 15 minutes after the activiators have been added, the following two additions are uniformly run in, with stirring, over a period of 4 hours during which time the internal temperature is maintained at 60° C: (1) the remaining 90% of the monomer mixture, (2) an aqueous solution of 500 g of demineralized water, 4 g of the Na-salt of a $C_{12}$–$C_{18}$-alkyl sulphonate, 20 g of stabilizer R and 2 g of Na-formaldehyde sulphoxylate. After the two additions have been completed, a solution of 2 g of Na-formaldehyde sulphoxylate in 50 g of demineralized water is introduced into the reaction vessel whose contents are then stirred for 4 hours at 60° C in order to complete polymerization. After cooling, the latex obtained is adjusted to pH 6.5 with 10% ammonia water. 2.5 kg of a latex of low viscosity having a solids content of 39.7 % by weight are obtained.

EXAMPLES 2 to 4

The procedure is as in Example 1, except that stabilizer R is replaced by the same quantity by weight of other sulphonamide stabilisers as shown in Table 2. The coagulation points of heat-sensitive latex mixtures produced with the latices of Examples 1 to 4 are also shown in Table 2. These heat-sensitive latex mixtures are prepared as follows:

To 250 g of latex 5 g of an organopolysiloxane (Coagulant WS) and 25 g of a 10 % aqueous ammonium chloride solution are added under stirring. The coagulation point of the mixtures is determined as follows: approximately 10 g of the heat-sensitized mixture are weighed into a glass beaker which is then placed into a water bath having a constant temperature of 80° C. A thermometer is placed into the beaker. The coagulation behavior and the increasing temperature of the mixture are observed while it is stirred uniformly. The coagulation point of the mixture is the temperature at which complete separation occurs between polymer and aqueous phase.

Table 2

| Latex of Example Number | Sulphonamide stabiliser | Coagulation temperature |
| --- | --- | --- |
| 1 | R | 42° C |
| 2 | O | 38° C |
| 3 | M | 54° C |
| 4 | J | 60° C |

EXAMPLES 5 to 7

The procedure is as in Examples 1 to 4, except that the Na-salt of a $C_{12}$–$C_{18}$-alkyl sulphonate is replaced with the same quantity by weight of the Na-salt of a dodecyl benzene sulphonate. The sulphonamide stabilizers used during polymerization are used in the same quantity by weight as in tests 1 to 4. Table 3 shows the stabilizers used and the coagulation points of the heat-sensitive latex mixtures which are prepared as follows:

To 250 g of latex 15 g of a 25 % aqueous solution of the sulphonamide stabiliser added during preparation of the latex and 5 g of an organopolysiloxane (Coagulant WS) are added under stirring. The coagulation points are determined in the same way as described in Examples 2 to 4.

Table 3

| Latex of Example Number | Sulphonamide stabiliser | Coagulation temperature |
| --- | --- | --- |
| 5 | F | 36° C |
| 6 | J | 38° C |
| 7 | L | 32° C |

EXAMPLES 8 to 10

A solution of 20 g of the Na-salt of a $C_{12}$–$C_{18}$-alkyl sulphonate (Examples 8 and 9) or 20 g of the Na-salt of a dodecyl benzene sulphonic acid (Example 10) and 10 g (Example 8) or 20 g (Examples 9 and 10) of sulphonamide stabilizer A, in 1900 g of demineralized water is initially introduced into a 6 liter sulphonation flask, followed by the addition of 10% of a monomer mixture consisting of 1200 g of n-butyl acrylate, 680 g of styrene, 60 g of methacrylic acid and 60 g of methacrylamide N-methylol methyl ether. After flushing with nitrogen, the contents of the flask are heated, under stirring to 60° C, followed by activation with 20 g of tert.- butyl hydroperoxide and a solution of 2 g of Na-formaldehyde sulphoxylate in 50 g of demineralized water. 30 minutes after activation the following two additions are uniformly added under stirring over a period of 4 hours:

(1) the remaining 90% of the monomer mixture, (2) an aqueous solution of 1000 g of demineralized water, 20 g of the Na-salt of a $C_{12}$–$C_{18}$-alkyl sulphonate (Examples 8 and 9) or 20 g of the Na-salt of a dodecyl benzene sulphonic acid (Example 10), 10 g (Example 8)respectively 8 g (Examples 9 and 10) of sulphonamide stabilizer A and 4 g of Na-formaldehyde sulphoxylate. The internal temperature is kept at 60° C. On completion of the additions, a solution of 2 g of Na-formaldehyde sulphoxylate in 50 g of demineralized water is introduced, followed by stirring for another 4 hours at 60° C. After cooling, approximately 5 kg of a thinly liquid, stable latex having a solids concentration of approximately 40% is obtained in every case. The latices thus obtained are heat-sensitized in accordance with the following recipe: to 250 g of latex, 5 g of an aqueous 25 % solution of sulphonamide stabilizer A, 5 g of organopolysiloxane (Coagulant WS) and 7.5 g of an aqueous 10 % of ammonium chloride, are added under stirring. The coagulation temperatures are determined in the same way as described above.

Table 4

| Latex of Example Number | Sulphonamide stabiliser | Coagulation temperature |
| --- | --- | --- |
| 8 | A | 50° C |
| 9 | A | 54° C |
| 10 | A | 46° C |

EXAMPLE 11

The following components are introduced into a 40 liter capacity fine-steel autoclave equipped with a cooling system, stirrer and thermometer: 12.6 kg of demineralized water, 0.45 kg of the Na-salt of a $C_{12}$–$C_{18}$-alkyl sulphonic acid, 0.12 kg of an ethylene oxide addition product (15mols) with nonyl phenol, 0.05 kg of the Na-salt of a condensation product of naphthalene sulphonic acid and formaldehyde,0.015 kg of sodium sulphate, 0.06 kg of tert.-dodecyl mercaptan and 0.4 kg of a 90% methacrylic acid. The reaction vessel is then closed, flushed with nitrogen and the following quantities of monomers introduced under pressure: 5.7 kg of acrylonitrile and 9.0 kg of butadiene. The internal temperature is adjusted to 17° C and the following solutions added for activation: (1) 10 g of p-menthane hydroperoxide in 50 g of acrylonitrile, and (2) 10 g of Na-formaldehyde sulphoxylate and 0.05 g of iron (II) sulphate in 50 g of demineralized water. After polymerization has started, the internal temperature is increased to 40° C over a period of 15 minutes. At a concentration of 25% (determined by concentrating a sample by evaporation), the following solution is introduced under pressure into the reaction vessel: 1 kg of demineralized water, 0.15 kg of the Na-salt of a $C_{12}$–$C_{18}$-alkyl sulphonic acid, 0.15 kg of an ethylene oxide addition product (15 mols) with nonyl phenol and 0.05 kg of the Na-salt of a condensation product of naphthalene sulphonic acid and formaldehyde. After a concentration of 51% has been reached (determined by concentrating a sample by evaporation), the reaction is stopped by the addition of 1 kg of an 8% aqueous Na-dithionite solution, the latex conserved with 0.4 kg of a 50% emulsion of a phenolic anti-ageing product and freed from residual monomers by stirring in vacuo. The 50% latex obtained was adjusted to pH 5.5 with 13 % aqueous ammonia solution.

The following mixtures were prepared with this latex which does not contain any sulphonamide stabilisers from the polymerisation reaction:

a. A mixture of 1 g of organopolysiloxane (Coagulant WS) and 120 g of demineralised water is introduced into 200 g of latex. Heavy coagulate formation is observed. The latex coagulates completely when the vulcanization chemicals required to crosslink the polymer are stirred in, having previously been made into a finely dispersed paste by stirring for 24 hours in a ball mill.

b. Stable heat-sensitive latex mixtues which do not undergo any coagulate formation when the heat sensitizer and vulcanization chemicals are added are obtained when sulphonamide stabilizers are added to the latex. The following recipe is used:

a mixture of 3 g of sulphnamide stabilizer, 1 g of organopolysiloxane (Coagulant WS) and 120 g of demineralized water are stirred into 200 g of latex. Following the addition of 40 g of a conventional 30% vulcanization paste, the mixture has a coagulation point favorable for further processing which is retained with hardly any change for at least 10 days. Table 5 below shows the coagulation temperatures of heat sensitive latex mixtures prepared in accordance with this recipe using some of the previously described sulphonamide stabilizers.

Table 5

| Latex of Example Number | Sulphonamide stabiliser | Coagulation temperature immediately | after 7 days |
| --- | --- | --- | --- |
| 11 | none | unstable | — |
| 11 | B | 40° C | 39° C |
| 11 | C | 35° C | 34° C |
| 11 | G | 39° C | 39° C |
| 11 | H | 35° C | 36° C |
| 11 | M | 36° C | 36° C |
| 11 | T | 48° C | 49° C |
| 11 | U | 37° C | 37° C |

EXAMPLE 12

The following components are introduced into a 250 liter capacity fine-steel autoclave equipped with a cooling system, stirrer and thermometer: 45.5 kg of demineralized water, 0.42 kg of the Na-salt of a $C_{12}$–$C_{18}$-alkyl sulphonic acid and 0.02 kg of caustic soda. The reaction vessel is closed and flushed with nitrogen. The following ingredients are then added: (1) 20% of a monomer mixture of 42 kg of butadiene, 23.8 kg of acrylonitrile, 1.4 kg of methacrylamido-N-methylol methyl ether, 1.4 kg of acrylic acid and 0.49 kg of tert.-dodecyl mercaptan: (2) 20% of an aqueous solution of 21 kg of demineralized water and 1.4 kg of methacrylamide. After heating to 35° C the mixture is activated with (1) 0.7 kg of tert.-butyl hydroperoxide, (2) a solution of 0.14 kg of Na-formaldehyde sulphoxylate in 1.4 kg of demineralized water. 1 hour after activation, the following liquid solutions are uniformly introduced over a period of 10 hours: )1) the remaining 80% of the monomer mixture, (2) the remaining 80% of the aqueous methacrylamide solution, (3) an aqueous solution of 0.14 kg of Na-formaldehyde sulphoxylate, 3kg of the Na-salt of a $C_{12}$–$C_{18}$-alkyl sulphonic acid and 0.35 kg of sulphonamide stabilizer A in 28 kg of demineralized water. The internal temperature is maintained at 35 to 40° C both during the additions and during stirring for another 4 hours. The reaction is then stopped by the addition of a solution of 0.16 kg of diethyl hydroxylamine in 3.5 kg of demineralized water, and the latex adjusted to pH 7.2 by the addition of semi concentrated aqueous ammonia solution. The latex is conserved with 1.4 kg of a 50% emulsion of a standard commercial-grade phenolic anti-ageing product. The latex is freed from residual monomers by stirring in vacuo. A 42.2% (solids content) latex of small parts is obtained.

This latex can be heat-sensitized with an organopolysiloxane (Coagulant WS) without the addition of another stabilizer. To this end, 240 g of latex (adjusted to a solids content of 40%) are stirred with a mixture of 2 g of organopolysiloxane (Coagulant WS) and 100 g of demineralized water. The coagulation point of this mixture is 38° C and remains constant for more than 10 days.

EXAMPLE 13

The following components are introduced into a 250 liter capacity fine-steel autoclave equipped with a stirrer, thermostatic control system and thermometer: 32 kg of demineralized water, 0.8 kg of the Na-salt of a dodecyl benzene sulphonic acid, 0.4 kg of sulphonamide stabilizer B, 0.03 kg of caustic soda and 0.004 kg of iron (II) sulphate. The reaction vessel is closed and flushed with nitrogen, after which 10% of the following monomer mixture are added: 48 kg of butadiene, 28.8 kg of styrene, 1.8 kg of a 90% methacrylic acid, 1.6 kg of methacrylamido-N-methylol methyl ether and 0.4 kg of tert.-dodecyl mercaptan. The contents of the autoclave are heated to 60° C and then activated with (1) 0.64 kg of tert.-butyl hydroperoxide in 0.8 kg of methanol, (2) 0.16 kg of Na-formaldehyde sulphoxylate in 1.6 kg of demineralized water. 1 hour afer activation, the following two liquid additions are uniformly introduced over a period of 8 hours: (1) the remaining 90% of the monomer mixture, (2) an aqueous solution of 2.8 kg of the Na-salt of a dodecyl benzene sulphonic acid, 0.16 kg of Na-formaldehyde sulphoxylate and 0.080 kg of caustic soda in 40 kg of demineralized water. The internal temperature is maintained at 60° C both during the additions and during stirring for another 8 hours. The reaction is then stopped by adding a solution of 0.16 kg of sodium dithionite in 4 kg of demineralized water, and the latex conserved with 2.4 kg of a 50% emulsion of a standard commercial-grade phenolic anti-ageing product and adjusted to pH 6.5 by the addition of 14% aqueous ammonia solution. The latex is freed from unreacted monomers by stirring in vacuo. A 52% latex of small parts is obtained.

The latex can be heat-sensitized as follows: to 200 g of latex (adjusted to a solids content of 50%) a mixture of 5 g of organopolysiloxane (Coagulant WS), 25 g of demineralized water and 20 g of a 10% aqueous calcium chloride solution is added under stirring. No coagulate formation is observed. The mixture has a coagulation temperature of 52° C.

We claim:

1. A heat-sensitized polymer latex mixture containing from 0.05 to 10% by weight, based on the polymer, of a heat-sensitizer, and from 0.1 to 10% by weight, based on the polymer, of a sulphonamide acting as a stabilizer corresponding to the general formula:

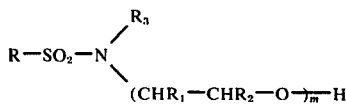

wherein:
R represents alkyl, chloroalkyl or cycloalkyl having from 8 to 30 carbon atoms or alkaryl having from 10 to 30 carbon atoms,
$R_1$ and $R_2$ which may be the same or different, represent hydrogen, chloromethyl, methyl, ethyl or phenyl,
$m$ is 0 or an integer from 1 to 50, and
$R_3$ represents hydrogen, alkyl, alkaryl, aryl or $-(CHR_1-CHR_2-O)_{\overline{m}} H$ wherein $R_1$, $R_2$ and $m$ are as defined above.

2. A heat-sensitized polymer latex mixture as claimed in claim 1 in which:
R represents n-alkyl or chloroalkyl having 10 to 20 carbon atoms, or $C_8-C_{18}$ n-alkylphenyl,
$R_1$ and $R_2$ which may be the same or different, represent hydrogen or methyl,
m is 0 or an integer from 1 to 20, and
$R_3$ represents hydrogen or $-(CHR_1-CHR_2-O)_{\overline{m}} H$ wherein $R_1$, $R_2$ and $m$ are as defined above.

3. A process for the production of a heat-sensitive polymer latex mixture which comprises adding a sulphonamide as defined in claim 1 to a polymerizable monomer mixture either at the beginning of or during the course of latex polymerization in a quantity of from 0.1 to 10% by weight, based on the monomer, or adding the sulphonamide to the latex on completion of polymerization in a quantity of from 0.1 to 10% by weight, based on the polymer, and subsequently adding to the resulting latex from 0.05 to 10% by weight, based on the polymer, of a heat-sensitizer.

* * * * *